Oct. 17 1967 H. EPSTEIN ET AL 3,347,481

TAPE TRANSPORT METHOD

Filed Sept. 5, 1963 3 Sheets-Sheet 1

Inventors:
Herman Epstein
and Samuel Cogan
By: James J. Jennings, Jr. Atty.

Inventors:
Herman Epstein
and Samuel Cogan
By: James T. Jennings, Jr. Atty

Oct. 17 1967 H. EPSTEIN ETAL 3,347,481

TAPE TRANSPORT METHOD

Filed Sept. 5, 1963 3 Sheets-Sheet 3

Inventors:
Herman Epstein
and Samuel Cogan
By: James J. Jennings, Jr. Atty.

United States Patent Office 3,347,481

Patented Oct. 17, 1967

3,347,481

TAPE TRANSPORT METHOD

Herman Epstein, Philadelphia, and Samuel Cogan, Huntingdon Valley, Pa., assignors, by mesne assignments, to Borg-Warner Corporation, Chicago, Ill., a corporation of Illinois Filed Sept. 5, 1963, Ser. No. 306,895

2 Claims. (Cl. 242—55.12)

The present invention is directed to a novel method of and apparatus for transporting a strand of material from a supply reel to a take-up reel, and for effecting rewind of the material at a high speed without breaking the strand of material.

While applicable in different types of apparatus, the present invention finds particular utility in the field of transport systems for flexible tape. Such tape can be passed through a "reader" or optical scanning unit in which information imprinted or punched on the tape is translated into electrical signals representative of the information. In an attempt to approach the high operating speeds of computers, the peripheral equipment including tape reelers and readers designed for feeding information to, and receiving information from, such computers has been the subject of considerable research and development, particularly to significantly increase the operating speeds thereof. One substantially improved reeling mechanism for such a transport system is described in the copending application of George A. Harris, entitled, "Tape Reeler," filed Jan. 4, 1962, Ser. No. 164,312, now Patent No. 3,172,611, and assigned to the assignee of the present invention. A considerable forward step in this art was accomplished with that invention, by transferring control of the drive means for the supply reel from the dancer arm adjacent the supply reel to the arm next to the take-up reel during the latter half of the rewind cycle, to preclude operation at unduly high speeds as the diameter of the tape wound on the supply reel becomes greater than that remaining on the take-up reel. Thus, the tension forces applied to the tape during rewind are maintained within a range of values which militates against inadvertent breakage during this operation.

Even with the improved tape reeler described in such application, the control of the supply reel during rewind was effected by energization and deenergization of the drive motor in the supply reel, coupled with deenergization and energization of the brake unit associated with this reel. Accordingly, to maintain the requisite speed of operation and supply the necessary torque characteristics, a motor of appreciable size and cost is required.

It is, therefore, a primary object of the present invention to provide an improved material handling system which is more compact and less expensive than previous systems, and which is at least as effective in precluding tape breakage during the rewind and associated switching operations.

Another serious problem in this art is the inadvertent tape breakage which sometimes occurs as the apparatus is switched from the "rewind" to the "forward" or drive position. More specifically, as the tape is rewound considerable momentum is acquired by the two reels, the momentum being distributed between the two reels in relation to the amount of tape on each reel. Thus where a single control switch is provided to change the operation from the rewind to the forward mode, actuation of this switch changes the energization of the drive motors of the two reels, and immediately the take-up reel attempts to pull tape from the supply reel, even while the supply reel tends (because of its momentum) to continue turning in the rewind direction. The resultant tension may be of a level sufficient to break the tape.

It is thus another important object of the present invention to provide a tape reeler and associated control components which obviates the problem of tape breakage during the switching operation, especially from the rewind to the forward mode.

The foregoing and other objects of the present invention are realized in an inventive method whereby, in switching from the rewind to the forward mode of operation, each of the supply and take-up reels are braked, at least momentarily, to insure the momentum of the reels is decreased to a level which obviates tape breakage upon positive displacement in the opposite direction. In a preferred embodiment, such braking can be accomplished by storing energy in a suitable storage unit, such as a capacitor, during the rewind operation and returning the stored energy to the system to brake both reels upon subsequent switching to the forward mode.

In accordance with another aspect of the present invention, the control of the tape return from the take-up reel to the supply reel during rewind is not only effectively transferred to the dancer arm adjacent the take-up reel after the supply reel has more tape wound thereon than is on the take-up reel, but in addition the control of the supply reel during the latter portion of the rewind cycle is effected solely by energization and de-energization of the drive motor for the supply reel, without any operation of the brake unit associated with the supply reel.

To acquaint those skilled in the art with the best mode contemplated for making and using the invention, an explanation thereof is set forth in connection with the accompanying drawings, in the several figures of which like reference numerals identify like elements, and in which.

*Physical arrangement of the invention*

Figure 1:
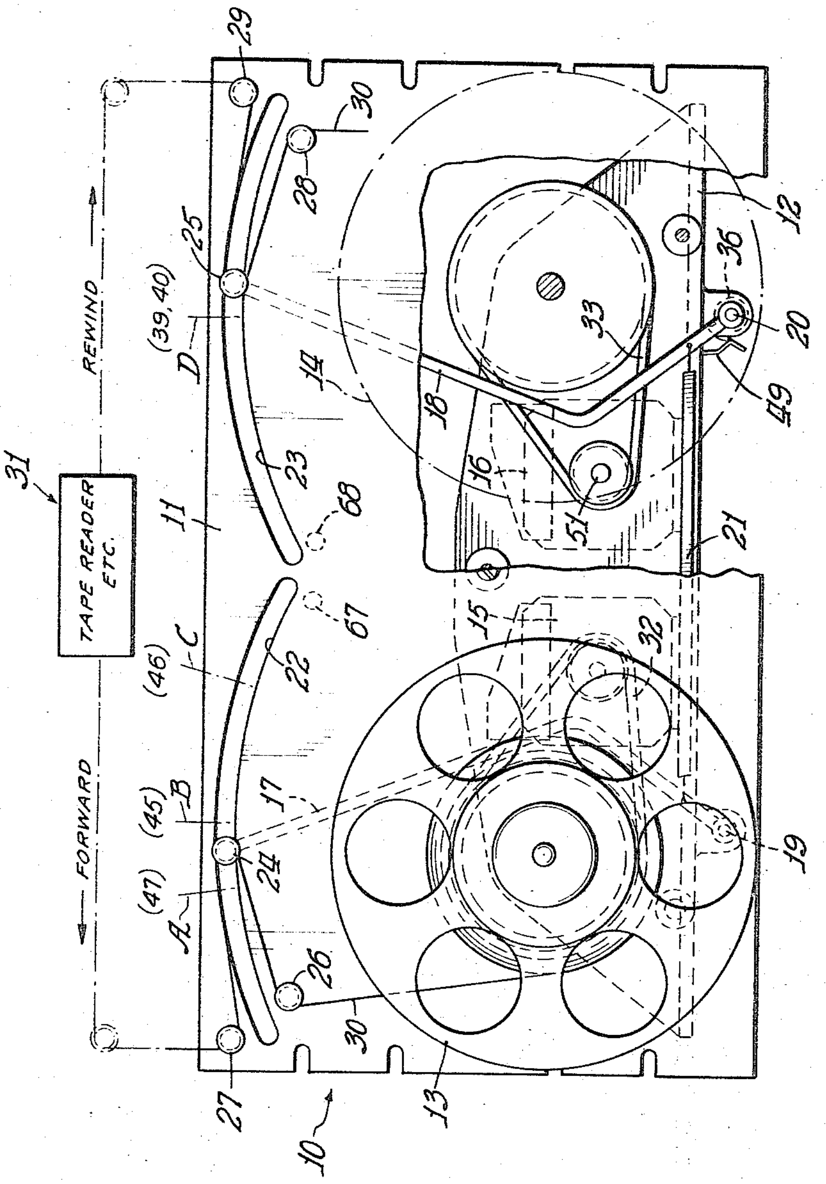
FIGURE 1 is a front view, partly broken away, of a tape reader constructed in accordance with the present invention.

The drawings of the present invention are somewhat related to those in the above-identified copending application. To facilitate understanding of both inventions, reference numerals from 10 through 70 have been utilized in the present application to identify components similarly denoted in the copending application, and numerals of a value exceeding 100 are utilized in this application either to identify components not shown in the copending application or to specifically identify components not previously referenced.

As shown in FIGURE 1, the present invention is embodied in a tape reeler 10 which includes a front mounting panel 11 extending upwardly from and at right angles to a supporting chassis 12. A supply reel 14 is provided to support a strand of tape for feeding through the system to be taken up on the left or take-up reel 13. A motor 16 is positioned to drive supply reel 14, and a sensing means or dancer arm 18 is disposed with the main portion of this arm positioned behind the front panel. The upper extremity of dancer arm 18 supports a roller or spool 25 which extends through an arcuate, elongated slot 23 in panel 11 for movement through an arc corresponding to the curvature of such slot. The lower part of dancer arm 18 is mounted on a shaft 20, in its turn received in a depending mounting ear affixed to chassis 12. In like manner left dancer arm 17 has its lower portion mounted on a shaft 19 for pivotal movement behind front panel 11, as the uppermost portion of dancer arm 17 supports a spool 24 which extends through arcuate slot 22 for curvilinear displacement therethrough. A spring 21 has its opposite end portions coupled to the dancer arms 17 and 18, so that the two dancer arms are urged toward each other, being kept apart by the tension of the tape or strand of material passing through the system. In addition to the spools or rollers supported at the respective ends of the dancer arm, additional fixed tape guides or spool members 26, 27, 28 and 29 are affixed to front panel 11 as indicated to provide additional reference points for passing the tape through the system.

It is thus evident that a tape, indicated by reference numeral 30, can pass (as the reeler is driven in the forward direction) from supply reel 14 upwardly and over spool 28, to the left and around spool 25, to the right to pass under spool 29 and upwardly, over suitable spools and through associated equipment which may be a tape reader 31, downwardly and around spool 27, to the right and around spool 24, thence to the left, over spool 26 and downwardly to be wound on take-up reel 13. Another motor 15 is provided and disposed as indicated to effect the driving of take-up reel 13. In the forward mode, for example, motor 15 through the medium of belt 32 effects angular displacement of take-up reel 13 in the counterclockwise direction to pull the tape through the system. Those skilled in the art will recognize that, although motors 15 and 16 are depicted, these two drive means may be replaced by a single motor with appropriate clutch arrangements to effect the selective driving of reels 13 and 14.

Figure 2:
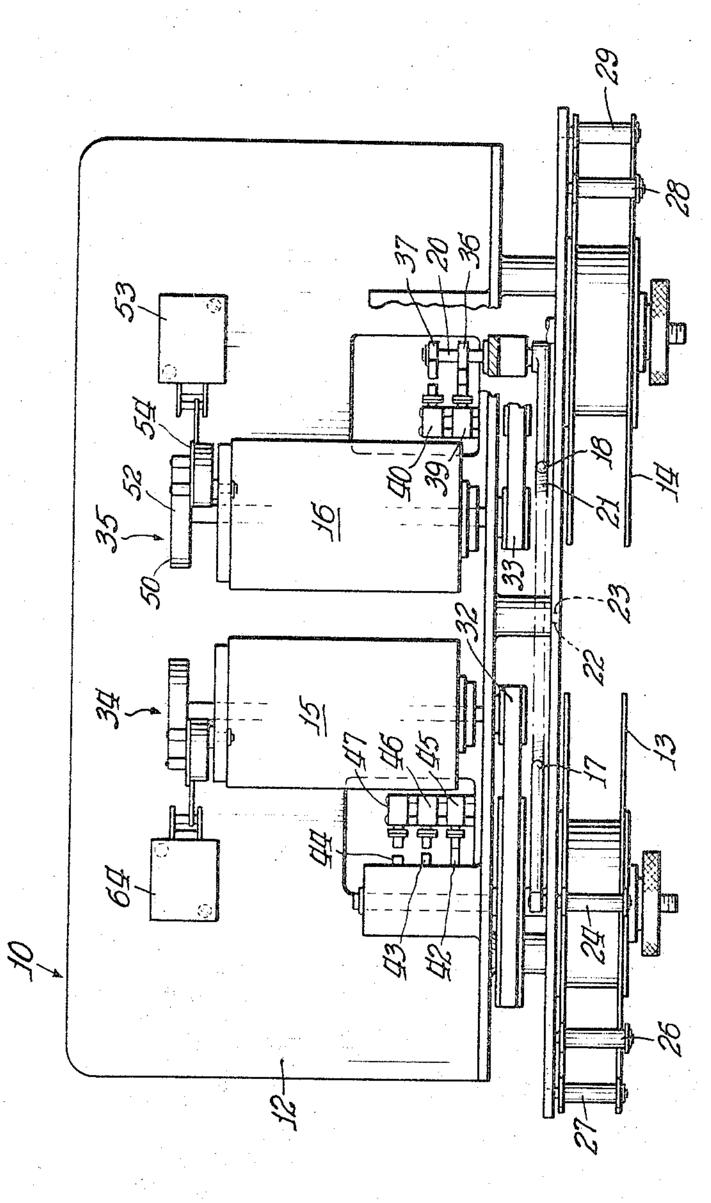
FIGURE 2 is a top view, partially broken away, of the embodiment illustrated in FIGURE 1.

Referring to FIGURE 2, a brake mechanism 34 is provided to halt rotation of motor 15, and another brake unit 35 is disposed adjacent motor 16 to halt this motor as brake 53 is energized. Dancer arm 18, and more specifically its lowermost shaft portion 20, has a plurality of cams 36 and 37 affixed thereto to effect the actuation of associated microswitches 39 and 40 as the uppermost portion of dancer arm 18 is displaced when tape is passing through the system. In like manner, the lower shaft portion 19 of the left dancer arm supports thereon cams or actuators 42, 43 and 44 positioned to engage and actuate associated microswitches 45, 46 and 47 responsive to the angular displacement of this dancer arm during operation of the reeler. The physical disposition of other switches, such as taut tape and out-of-tape switches, are not included in FIGURE 2 in that it is not helpful to an understanding of the present invention. In like manner the specifics of the cam actuator and microswitch arrangements, or the brake arrangements for effecting the halting of each of the reels are not indicated, but they are given in considerable detail in the above-identified copending application.

*Control arrangement*

Figure 3:
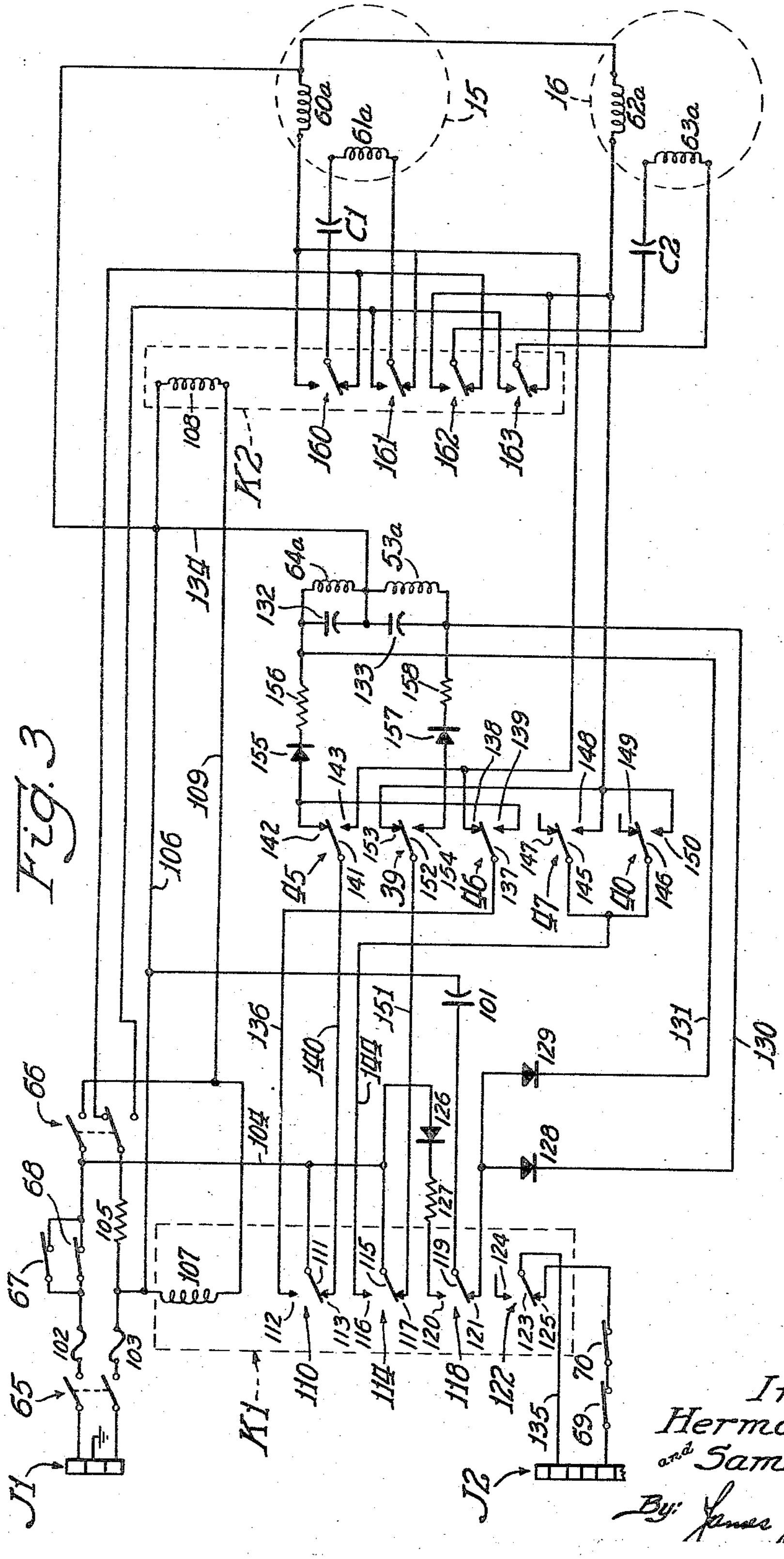
FIGURE 3 is a schematic diagram illustrating a circuit for regulating the invention to operate in accordance with the inventive teaching.

Considering now the schematic diagram of FIGURE 3, it is apparent upon comparison with the corresponding diagram (FIGURE 5) of the copending application that switch 41 shown in that diagram has been omitted from the showing of FIGURE 3 in the present application. This change in the switching arrangement and interconnection insures that brake 53 is not energized and de-energized simultaneously with the de-energization and energization of supply reel motor 16 in the last half of the rewinding cycle. The other important modification of the control system is emphasized by the addition of a capacitor 101 in FIGURE 3, which functions as an energy storage unit for accumulating energy during the rewind cycle and for rapidly returning this energy to the braking arrangement of the system when the control switch is returned to the forward position, thereby to remove substantially all of the momentum from the rotating reels. The specific connections of the system will now be described.

The input jack J1 is positioned to transfer power over suitable input conductors to an on-off power switch 65, the fixed contacts of which are respectively coupled to a pair of fuses 102 and 103. Fuse 102 is coupled over a pair of parallel-connected switches 67 and 68 both to the upper movable contact of forward-rewind switch 66 and, over conductor 104, to the first two contact sets of relay K1. Fuse 103 is coupled through a resistor 105 to the other movable contact of switch 66, and this fuse is also coupled to a conductor 106. Winding 107 of relay K1 is coupled between conductor 106 and the upper fixed contact of forward-rewind switch 66. Winding 108 of relay K2 is coupled, over conductors 106 and 109, in parallel with winding 107. Switches 67 and 68 are broken tape or out-of-tape switches. Their positions are indicated by the broken lines in FIGURE 1, adjacent the innermost portions of slots 22 and 23. Thus if the tape is broken the dancer arms are urged toward each other by spring 21 and, when both switches 67 and 68 are opened as the dancer arms reach their central positions, the power input circuit in FIGURE 3 is interrupted.

Relays K1 and K2 are both "rewind" relays, that is, they are actuated when forward-rewind switch 66 is displaced from the forward position (indicated in the drawing) to the rewind position. Relay K1 includes a first contact set 110 having a movable contact 111 and a pair of fixed contacts 112 and 113; a second contact set 114 having a movable contact 115 and a pair of fixed contacts 116 and 117; a third contact set 118 having a movable contact 119 and a pair of fixed contacts 120 and 121; and a fourth contact set 122, having a movable contact 123, and fixed contacts 124 and 125. Conductor 104 is coupled to each of movable contacts 111 and 115, and is further coupled, through a diode 126 and a resistor 127, to fixed contact 120 of contact set 118. Movable contact 119 is coupled through capacitor 101 to conductor 106. Fixed contact 121 is coupled to the anodes of a pair of diodes or rectifiers 128 and 129, respectively coupled over conductors 130 and 131 to opposed end portions of brake windings 53*a* and 64*a*. A first capacitor 132 is coupled across brake winding 64*a* and another capacitor 133 is coupled in parallel with brake winding 53*a*. The common connection between capacitors 132 and 133 is coupled to the junction of the brake windings and over conductor 134 to conductor 106.

Another interconnecting jack J2 is indicated in FIGURE 3, and a conductor 135 intercouples one terminal of this jack with movable contact 123 of contact set 122. Another input conductor is coupled through taut tape switches 69 and 70 to fixed contact 125. The other contact 124 in this set is not connected in the circuit. Each of switches 69 and 70 has a function which differs from that of switches 67 and 68, in that switches 69 and 70 are only actuated upon displacement of either dancer arm to its extreme outward position, that is, when its associated roller 24 or 25 is nearest the left or right edges of front panel 11. Thus if a taut tape condition is signalled by operation of either of switches 69 and 70, an interruption of the circuit provided through J2 is effected to produce a desired operation in the equipment connected over jack J2.

Fixed contact 112, of the uppermost contact set 110 of relay K1, is coupled over conductor 136 to movable contact 137 of switch 46, which also includes fixed contacts 138 and 139. Fixed contact 113 of contact set 110 is coupled over conductor 140 to movable contact 141 of switch 45, which also includes fixed contacts 142 and 143. Fixed contact 116 of set 114 is coupled over conductor 144 to movable contacts 145 and 146 of switches 47 and 40, respectively. Switch 47 includes an unconnected fixed contact 147 and another fixed terminal 148, and switch 40 includes an unconnected fixed terminal 149 and a fixed contact 150 for engagement with movable contact 146.

Fixed contact 117 of contact set 114 is coupled over a conductor 151 to movable contact 152 of switch 39, which also includes fixed contacts 153 and 154. Fixed contact 142 of uppermost switch 45 is coupled through a diode 155 and a resistor 156 to conductor 131, and also to the common connection between capacitor 132 and brake winding 64a. Fixed contact 154 of switch 39 is coupled through a diode or rectifier 157 and a resistor 158 to conductor 130, and to the common connection between capacitor 133 and brake winding 53a.

Relay K2 includes not only a winding 108, but also four contact sets 160, 161, 162 and 163. The specific circuit connections of these contact sets need not be elaborated, for their only function is to reverse the connections of windings 60a and 61a of motor 15, and likewise to effect reversal of the energy flow through windings 62a and 63a of motor 16, when the rewind switch is operated.

Considering the operation of the respective switches shown in FIGURE 3 in relation to the positions of dancer arms 17 and 18 in FIGURE 1, reference characters A, B, C and D have been utilized to indicate the physical locations at which the respective dancer arms effect operation of the switches. In more detail, as roller 24 on the end of dancer arm 17 passes location A, switch 47 is operated; as it passes location B, switch 45 is operated; and as it passes location C, switch 46 is actuated. Considering displacement of dancer arm 18, as roller 25 passes location D, both switch 39 and switch 40 are operated. Thus, as evident from the schematic showing of FIGURE 3 in which switch 66 is in the "forward" position, energy is transferred to contact sets 110 and 114 of relay K1, and over the normally closed contacts of these sets to switches 45 and 39. Switch 45 is regulated by dancer arm 17 as described, and in the illustrated position, a circuit is completed over contacts 141, 142 to energize winding 64a of brake unit 64 and halt rotation of reel 13. As the amount of slack tape adjacent reel 13 increases, dancer arm 17 moves to the right past location B, and switch 45 is operated to complete an energizing circuit for windings 60a and 61a of motor 15 concomitantly with the interruption of the energizing circuit for brake winding 64a. In an analogous manner switch 39 in the illustrated position completes an energizing circuit for windings 62a and 63a of motor 16, and when movable contact 152 engages contact 154, this switch completes an energizing circuit for brake winding 53a as the energizing circuit for motor 16 is interrupted.

To effect rewind, switch 66 is closed to operate relays K1 and K2 and actuate each of the contact sets associated with these relays. Accordingly during rewind switch 45 is, in effect, replaced by switch 46 to control selective energization of brake winding 64a and motor 15. Switch 39 is effectively replaced by both switches 40 and 47, with switch 40 regulating energization and de-energization of supply motor 16 during the initial portion of the rewind cycle. After more tape is present on reel 14 than on reel 13, dancer arm 18 remains to the right of location D during the latter portion of the rewind cycle, keeping switch 40 open. Thus control of reel 14 (or more precisely, motor 16) is, in effect, transferred from dancer arm 18 to dancer arm 17, which opens and closes switch 47 as it passes position A during the latter half of the rewind cycle.

It is again emphasized that, in accordance with the inventive concept, during rewind motor 16 is energized and de-energized without any related operation of brake unit 53. This is an important departure from previous methods of control, and has resulted in a more economical and compact unit by reason of utilization of a smaller motor to effect operation of the supply reel. Because brake 53 is not energized, the torque requirements imposed on the motor by the de-energization and subsequent energization are significantly less than those formerly imposed by reason of the physical braking of the reel each time motor 16 was de-energized.

It is noted that prior to closing of forward-rewind switch 66, there is no charging path for capacitor 101. Responsive to closure of switch 66 and operation of relays K1 and K2, movable contact 119 engages fixed contact 120 to complete a charging circuit for capacitor 101 which extends from input jack J1, over the upper contacts of switch 65, fuse 102, at least one of switches 67 and 68, conductor 104, rectifier 126, resistor 127, contacts 120, 119, capacitor 101, conductor 106, fuse 103, and the lower contacts of switch 65 to jack J1. Accordingly during the rewind cycle a unidirectional energy charge is accumulated across or in capacitor 101.

As switch 66 is returned to the illustrated position to place the equipment in the "forward" mode, capacitor 101 rapidly discharges over a path including the just-closed contacts 119, 121, and conductors 106 and 134. The remainder of the discharge path includes two separate parallel-coupled paths, one path including rectifier 128, conductor 130, and winding 53a, and the other path including rectifier 129, conductor 131, and winding 64a. Accordingly an energy pulse is passed through each of brake windings 53a and 64a to overcome the momentum of the rotating reels as each of reels 13 and 14 is braked to a virtual halt. The braking is accomplished irrespective of the amounts of tape on the two reels when switch 66 is actuated. In a preferred embodiment the circuit components have been selected to provide a discharge which is effective for a time period of the order of one-half to one second, to insure positive braking and substantially complete stopping of the reels. For various load and speed conditions, those skilled in the art will readily be able to vary such value according to system requirements.

To assist those skilled in the art in making and using the invention, identities and values of the components added to the reeler to provide momentary braking are set out below. It is emphasized, however, that such values are given by way of illustration only and in no sense by way of limitation.

COMPONENT:

| Capacitors: | Value in microfarads |
|---|---|
| 101 (250 volts) | 100 |
| 132 (150 volts) | 10 |
| 133 (150 volts) | 10 |
| **Resistors:** | **Value in ohms** |
| 127 | 110 |
| 156 | 800 |
| 158 | 800 |
| **Rectifiers:** | **Designation** |
| 126 | 1N1696 |
| 128 | 1N1696 |
| 129 | 1N1696 |
| 155 | 1N1696 |
| 157 | 1N1696 |

By practicing the unobvious method of the invention a novel reader is provided which militates against tape breakage and effects maximum efficiency and speed during the rewind and forward drive operations without endangering the tape from the standpoint of breakage. Such enhanced operation is achieved in part by regulating the system during the latter half of the rewind cycle only by energization and deenergization of the motor driving the supply reel at which the tape is being re-wound; there is no selective energization and de-energization of the supply reel brake in timed relation with the control of the motor. Another important factor is the braking, at least momentarily, of both reels as the equipment is switched from the rewind to the forward mode of operation. The braking is efficiently accomplished by utilizing an energy storage means, such as a capacitor, to receive energy over a relatively long time as the equipment is operated in the rewind mode, and to return the stored energy to the system over a very brief time period as the equipment is returned to the forward driving condition. The invention has proved simple to fabricate and install in existing and new reelers, and substantially reduces the incidence of tape breakage when installed.

Although only a specific embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. The method of controlling a material handling system which includes drive means and brake means for passing a strand of material from a supply reel to a take-up reel during forward operation and for reversing the direction of strand travel during rewind operation, which system includes a separate sensing means adjacent each of the reels to indicate the amount of slack material adjacent each reel, comprising the steps of selectively energizing and de-energizing both the drive means and the brake means during forward operation in accordance with the respective positions of the two sensing means, driving the supply reel at a substantially constant speed during rewind operation when there is more tape on the take-up reel than on the supply reel, while selectively energizing and de-energizing the drive means and de-energizing and energizing the brake means for the take-up reel, and regulating energization and de-energization only of the drive means for the supply reel during rewind operation when there is more tape on the supply reel than on the take-up reel in accordance with the position of the sensing means adjacent the take-up reel.

2. The method of controlling a tape reeler which includes an individual drive means and a brake means for each of the supply and take-up reels and a separate dancer arm positioned adjacent each of the reels to indicate the amount of slack tape adjacent such reel, comprising the steps of selectively energizing and de-energizing both the drive means and the brake means for each reel during forward operation of the reeler in accordance with the respective positions of the two dancer arms, driving the supply reel at a substantially constant speed during rewind operation when there is more tape on the take-up reel than on the supply reel, while selectively energizing and de-energizing the drive means and de-energizing and energizing the brake means for the take-up reel, and regulating energization and de-energization only of the drive means for the supply reel during rewind operation when there is more tape on the supply reel than on the take-up reel in accordance with the position of the dancer arm adjacent the take-up reel.

References Cited

UNITED STATES PATENTS

| | | | |
|---|---|---|---|
| 2,923,488 | 2/1960 | Gratian et al. | 242—55.12 |
| 3,100,554 | 8/1963 | Doubek. | |
| 3,172,611 | 3/1965 | Harris | 242—55.12 |
| 3,218,529 | 11/1965 | Evans | 318—7 |
| 3,269,670 | 8/1966 | Brian et al. | 242—55.12 |

FRANK J. COHEN, *Primary Examiner.*

G. F. MAUTZ, *Examiner.*